H. W. CAUDELL.
HOE.
APPLICATION FILED SEPT. 6, 1911.
1,023,720.
Patented Apr. 16, 1912.
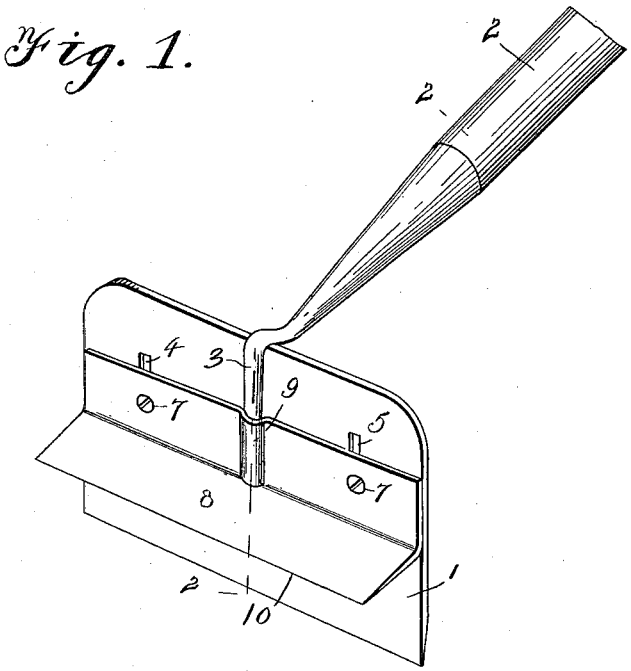
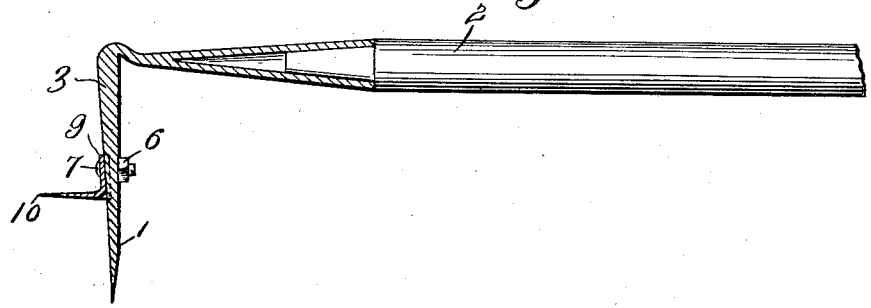
Inventor
Henry W. Caudell
Witnesses
By Victor J. Evans
Attorney

UNITED STATES PATENT OFFICE.

HENRY W. CAUDELL, OF HOMER, GEORGIA.

HOE.

1,023,720.	Specification of Letters Patent.	Patented Apr. 16, 1912.

Application filed September 6, 1911. Serial No. 647,845.

*To all whom it may concern:*

Be it known that I, HENRY W. CAUDELL, a citizen of the United States, residing at Homer, in the county of Banks and State of Georgia, have invented new and useful Improvements in Hoes, of which the following is a specification.

This invention relates to certain and novel improvements in cotton and garden hoes, and hoes for general use.

In carrying out my invention it is my purpose to provide an ordinary hoe with an adjustable stop or blade, whereby the depth of the insertion of the hoe within the ground may be readily regulated, and also whereby the blade may be employed, upon the backward movement of the hoe, for severing weeds or other growths.

With the above recited objects, and others of a similar nature in view, the invention consists in the construction, combination and arrangement of parts set forth in and falling within the scope of the appended claim.

In the accompanying drawings,— Figure 1 is a perspective view of a hoe constructed in accordance with the present invention. Fig. 2 is a central vertical transverse sectional view taken upon the line 2—2 of Fig. 1.

Referring now to the drawings in detail, the numeral 1 designates an ordinary hoe blade and 2 the handle therefor. The blade is integrally formed with a socket for the reception of the handle and said socket projects upon the outer face of the blade in the usual manner to provide a reinforcement 3.

The blade is formed adjacent its vertical edges with elongated slots 4 and 5, and the said slots are adapted to receive securing elements, such as nuts 6 and bolts 7, whereby a substantially L-shaped stop blade 8 may be adjustably connected with the hoe blade proper. This stop blade is centrally formed with an inwardly bulged portion 9 whereby the said stop blade 8 may be vertically adjusted upon the hoe blade over the reinforcement 3. It may be here added that the reinforcement 3 also serves as a means in connection with the said bulging portion 9 for retaining the stop blade 8 in a proper position upon the hoe blade.

The simplicity of the device, as well as the advantages thereof will, it is thought, from the above description, be perfectly apparent to those skilled in the art to which such inventions appertain without further detailed description, it being thought only necessary to add that the horizontal member of the L-shaped stop blade may have its edge sharpened, as designated by the numeral 10, so that this portion of the member 8 may be employed for cutting weeds or the like.

Having thus fully described the said invention, what I claim is:—

In combination with a hoe blade provided with the usual socket and the reinforcement upon its outer face, of an L-shaped stop blade, said stop blade being centrally provided with a bulging portion adapted to overlie the reinforcement of the hoe blade, and means for permitting the vertical adjustment of the stop blade upon the hoe blade.

In testimony whereof I affix my signature in presence of two witnesses.

HENRY W. CAUDELL.

Witnesses:
 A. C. HILL,
 RALPH MEEKS.

---

Copies of this patent may be obtained for five cents each, by addressing the "Commissioner of Patents, Washington, D. C."